(12) United States Patent  
Summerson et al.

(10) Patent No.: US 12,190,375 B2
(45) Date of Patent: *Jan. 7, 2025

(54) PROCESSING SYSTEM TO GENERATE RISK SCORES FOR ELECTRONIC RECORDS

(71) Applicant: HARTFORD FIRE INSURANCE COMPANY, Hartford, CT (US)

(72) Inventors: Doug A Summerson, Canton, CT (US); Shane Eric Barnes, Avon, CT (US); Peter M. Hill, Bloomfield, CT (US); Davis Preston Robinson, Manchester, NH (US); Joseph Peter Schmit, Grand Ledge, MI (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 60 days.

This patent is subject to a terminal disclaimer.

(21) Appl. No.: 18/312,712

(22) Filed: May 5, 2023

(65) Prior Publication Data

US 2023/0274351 A1    Aug. 31, 2023

Related U.S. Application Data

(63) Continuation of application No. 15/950,740, filed on Apr. 11, 2018, now Pat. No. 11,704,731.

(51) Int. Cl.
*G06Q 40/03* (2023.01)
*G06N 7/01* (2023.01)
*G06Q 40/08* (2012.01)

(52) U.S. Cl.
CPC .............. *G06Q 40/03* (2023.01); *G06N 7/01* (2023.01); *G06Q 40/08* (2013.01)

(58) Field of Classification Search
None
See application file for complete search history.

(56) References Cited

U.S. PATENT DOCUMENTS 5,970,464 A * 10/1999 Apte ................. G06Q 40/08
705/4
8,655,687 B2 * 2/2014 Zizzamia ........... G06Q 10/0635
705/4

(Continued)

OTHER PUBLICATIONS

Image Acquistion and Processing for Insurance Risk Assessments, published Oct. 30, 2017, downloaded from https://priorart.ip.com/IPCOM/000251405. (Year: 2017).*

(Continued)

*Primary Examiner* — Kelly S. Campen
(74) *Attorney, Agent, or Firm* — Buckley, Maschoff & Talwalkar LLC

(57) ABSTRACT

According to some embodiments, an automated scoring analysis computer may access information in a historical data store, including sets of attribute values and prior results for a plurality of prior associations, to create a scoring model. An indication of a selected potential association from a potential association data store may be received, including a set of attribute values. The scoring analysis computer may then calculate a risk score for the selected potential association based on the scoring model. A front-end application computer server may automatically select a workflow path from a plurality of potential workflow paths.

20 Claims, 15 Drawing Sheets

(56) References Cited

U.S. PATENT DOCUMENTS

| | | | | |
|---|---|---|---|---|
| 9,501,799 B2* | 11/2016 | Bothwell | | G06N 20/20 |
| 9,830,663 B2* | 11/2017 | Roberts | | G06Q 10/06316 |
| 9,836,795 B2* | 12/2017 | Roberts | | G06Q 40/08 |
| 9,875,509 B1* | 1/2018 | Harvey | | G06T 17/20 |
| 11,847,937 B1* | 12/2023 | Little | | G09B 5/12 |
| 11,875,470 B2* | 1/2024 | Little | | G06T 19/003 |
| 2005/0144114 A1* | 6/2005 | Ruggieri | | G06Q 40/04 |
| | | | | 705/37 |
| 2007/0260499 A1* | 11/2007 | Greef | | G06Q 10/0639 |
| | | | | 705/7.26 |
| 2009/0119133 A1* | 5/2009 | Yeransian | | G06Q 40/08 |
| | | | | 705/4 |
| 2010/0205016 A1* | 8/2010 | Chen | | G16H 50/30 |
| | | | | 705/4 |
| 2012/0284052 A1* | 11/2012 | Saukas | | G06Q 10/00 |
| | | | | 705/3 |
| 2013/0262530 A1* | 10/2013 | Collins | | G06Q 40/08 |
| | | | | 707/812 |
| 2014/0244317 A1* | 8/2014 | Roberts | | G06Q 40/08 |
| | | | | 705/4 |
| 2014/0280269 A1* | 9/2014 | Schultz | | G06F 16/29 |
| | | | | 707/758 |
| 2014/0330594 A1* | 11/2014 | Roberts | | G06Q 40/08 |
| | | | | 705/4 |
| 2015/0073835 A1* | 3/2015 | Sivagnanam | | G06Q 40/08 |
| | | | | 705/4 |
| 2015/0187011 A1* | 7/2015 | Purandare | | G06Q 40/08 |
| | | | | 705/4 |
| 2016/0012542 A1* | 1/2016 | Steben | | G06Q 40/08 |
| | | | | 705/4 |
| 2016/0248800 A1* | 8/2016 | Ng | | G06Q 40/06 |
| 2017/0046787 A1* | 2/2017 | Bothwell | | G06Q 40/08 |
| 2017/0154382 A1* | 6/2017 | McLaughlin | | G06Q 40/08 |
| 2017/0301028 A1* | 10/2017 | Strabel | | G06F 16/24578 |
| 2017/0308958 A1* | 10/2017 | Rieth | | G06Q 40/08 |
| 2017/0322928 A1* | 11/2017 | Gotchev | | G06Q 40/08 |
| 2018/0096055 A1* | 4/2018 | Houser | | G06F 16/3344 |
| 2018/0124098 A1* | 5/2018 | Carver | | G06N 20/00 |

OTHER PUBLICATIONS

Image Acquistion and Processing for Insurance Risk Assessments, published Oct. 30, 2017, downloaded from https://priorart.io.com/IPCOM/000251405. (Year: 2017) (Year: 2017).*

* cited by examiner

FIG. 4

PROCESSING SYSTEM TO GENERATE RISK SCORES FOR ELECTRONIC RECORDS

CROSS-REFERENCE TO RELATED APPLICATIONS

The present application is a continuation of U.S. patent application Ser. No. 15/950,740, entitled "PROCESSING SYSTEM TO GENERATE RISK SCORES FOR ELECTRONIC RECORDS" and filed on Apr. 11, 2018. The entire content of that application is incorporated herein by reference.

BACKGROUND

In some cases, a risk value associated with an enterprise system may depend at least in part on attribute values of electronic records representing a plurality of potential associations with the enterprise system. For example, the risk value might tend to increase when a specific type of attribute value increases (or decrease when another type of attribute value increases). Moreover, an accurate prediction of the risk value may be desired. Manually entering information to receive predictions and/or decisions about the risk value, however, can be a time consuming and error prone process, especially when a substantial number of electronic records and/or attribute variables may influence the behavior of the system. An enterprise might, under certain conditions, gather additional information about a potential association to improve the decision-making process. This approach, however, may be burdensome (e.g., because the additional information may be gathered even when it is not necessarily required). Similarly, a large and diverse amount of third-party information might further complicate these tasks. Note that improving the performance of the system and/or the accuracy of decisions made about potential associations might result in substantial improvements to the operation of the enterprise and/or one or more networks associated with the enterprise (e.g., by reducing an overall number of electronic messages that need to be created and transmitted via the network).

It would be desirable to provide systems and methods to automatically create risk scores for electronic records in a way that provides faster, more accurate results and that allows for flexibility and effectiveness when responding to those results.

SUMMARY OF THE INVENTION

According to some embodiments, systems, methods, apparatus, computer program code and means are provided to automatically create risk scores for electronic records in a way that provides faster, more accurate results and that allow for flexibility and effectiveness when responding to those results. In some embodiments, an automated scoring analysis computer may access information in a historical data store, including sets of attribute values and prior results for a plurality of prior associations, to create a scoring model. An indication of a selected potential association from a potential association data store may be received, including a set of attribute values. The scoring analysis computer may then calculate a risk score for the selected potential association based on the scoring model. A front-end application computer server may select a workflow path from a plurality of potential workflow paths.

Some embodiments comprise: means for accessing, by an automated scoring analysis computer, information in a historical data store, including sets of attribute values and prior results for a plurality of prior associations, to create a scoring model; means for receiving an indication of a selected potential association from a potential association data store, including a set of attribute values; means for calculating a risk score for the selected potential association based on the scoring model; means for automatically selecting, by a front-end application computer server, a workflow path from a plurality of potential workflow paths.

In some embodiments, a communication device associated with a front-end application computer server exchanges information with remote devices. The information may be exchanged, for example, via public and/or proprietary communication networks.

A technical effect of some embodiments of the invention is an improved and computerized way to automatically create risk scores for electronic records in a way that provides faster, more accurate results and that allow for flexibility and effectiveness when responding to those results. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 4 is an example of an electronic record risk score interactive user display according to some embodiments.

DETAILED DESCRIPTION

The present invention provides significant technical improvements to facilitate electronic messaging and dynamic data processing. The present invention is directed to more than merely a computer implementation of a routine or conventional activity previously known in the industry as it significantly advances the technical efficiency, access and/or accuracy of communications between devices by implementing a specific new method and system as defined herein. The present invention is a specific advancement in the area of electronic record attribute analysis by providing benefits in data accuracy, data availability and data integrity and such advances are not merely a longstanding commercial practice. The present invention provides improvement beyond a mere generic computer implementation as it involves the processing and conversion of significant amounts of data in a new beneficial manner as well as the interaction of a variety of specialized client and/or third-party systems, networks, and subsystems. For example, in the present invention information may be processed, automatically classified, forecast, and/or predicted via a front-end application server and results may then be analyzed accurately to evaluate the accuracy of various results and/or facilitate predictions associated with future performance, thus improving the overall efficiency of the system associated with message storage requirements and/or bandwidth considerations (e.g., by reducing the number of messages that need to be transmitted via a network). Moreover, embodiments associated with predictive models might further improve risk values, predictions of risk values, allocations of resources, electronic record processing decisions, etc.

Figure 1:
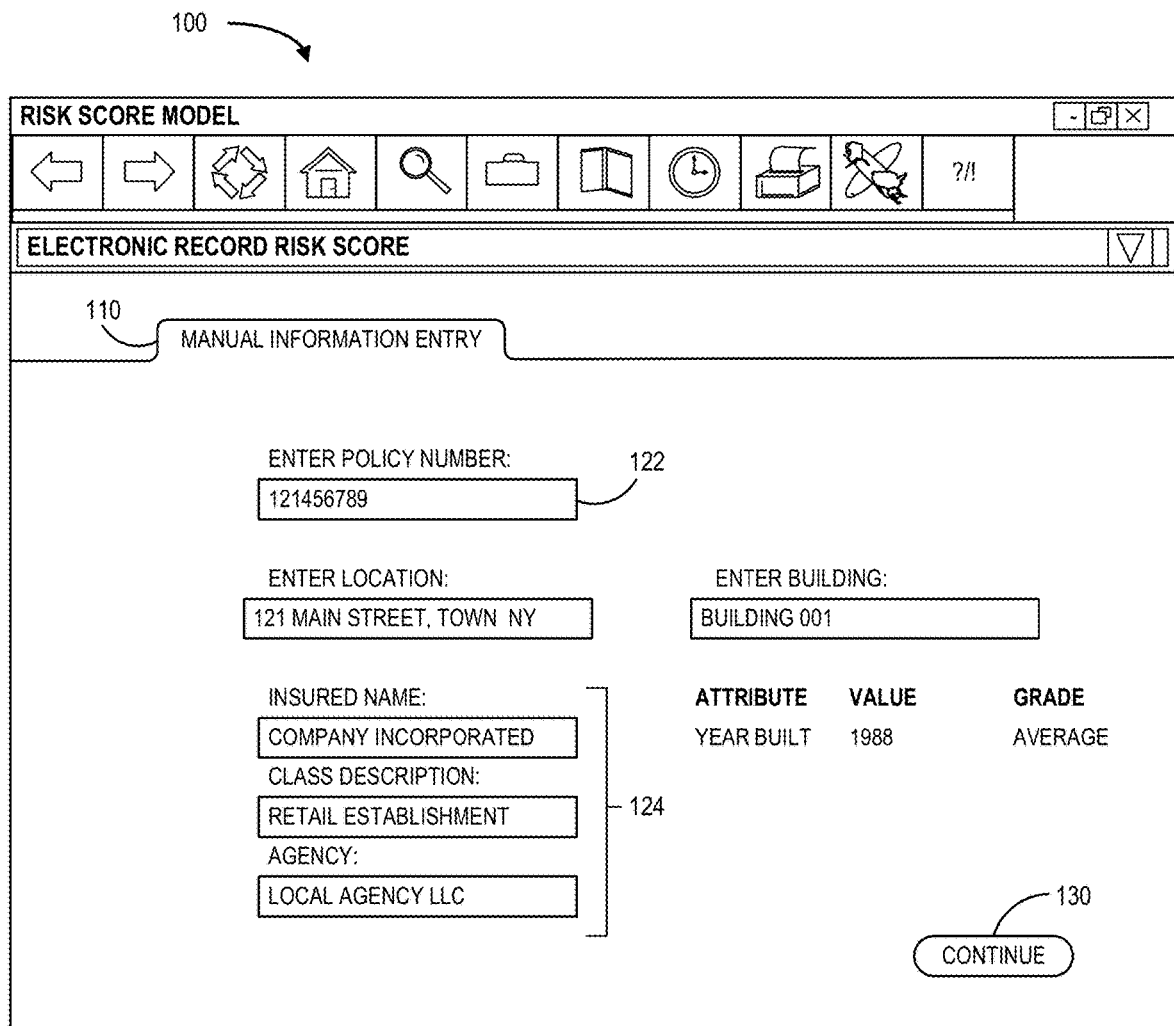
FIG. 1 illustrates manual entry of information associated with a risk score.

In some cases, a risk value associated with an enterprise system may depend at least in part on attribute values of electronic records representing a plurality of potential associations with the enterprise system. For example, the risk value might tend to increase when a specific type of attribute value increases (or decrease when another type of attribute value increases). Moreover, an accurate prediction of the risk value may be desired. Manually entering information to receive predictions and/or decisions about the risk value, however, can be a time consuming and error prone process, especially when a substantial number of electronic records and/or attribute variables may influence the behavior of the system. For example, FIG. 1 illustrates manual entry of information associated with a risk score. In particular, a display 100 might include a manual information entry portion 110 including fields that can be used to manually type in information about a potential association (e.g., an insurance policy number 122, location, insured details 124, etc.). When the information is entered, the user may select a "Continue" icon 130 to receive risk information about the potential association. Such an approach can take a substantial amount of time and some of the information might be incorrectly entered.

Also note that an enterprise might, under certain conditions, gather additional information about a potential association to improve the decision-making process. This approach, however, may be burdensome (e.g., because the additional information may be gathered even when it is not necessarily required). Similarly, a large and diverse amount of third-party information might further complicate these tasks. Note that improving the performance of the system and/or the accuracy of decisions made about potential associations might result in substantial improvements to the operation of the enterprise and/or one or more networks associated with the enterprise (e.g., by reducing an overall number of electronic messages that need to be created and transmitted via the network).

Figure 2:
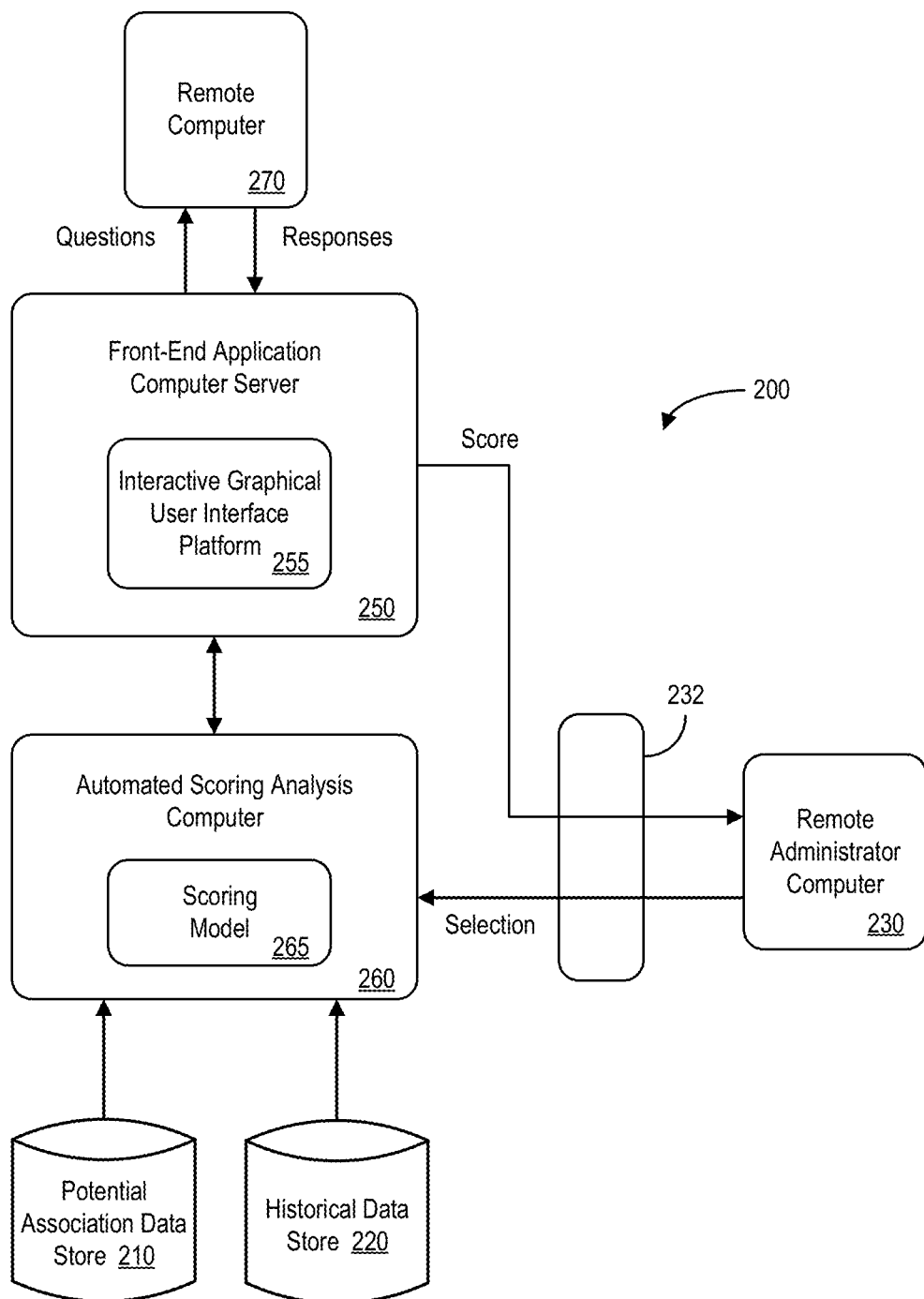
FIG. 2 is a high-level block diagram of a system according to some embodiments.

It would be desirable to provide systems and methods to automatically create risk scores for electronic records in a way that provides faster, more accurate results and that allows for flexibility and effectiveness when responding to those results. FIG. 2 is a high-level block diagram of a system 200 according to some embodiments of the present invention. In particular, the system 200 includes a front-end application computer server 250 and automated scoring analysis computer 260 that may access information in a potential association computer store 210 (e.g., storing a set of electronic records representing risk associations, each record including, for example, one or more communication addresses, attribute variables, etc.). The automated scoring analysis computer 260 may also retrieve information from a historical data store 220 (e.g., storing information about prior insurance claims) to create a scoring model 265. The front-end application computer server 250 and/or automated scoring analysis computer 260 may also exchange information with a remote administrator computer 230 (e.g., via a firewall 232). According to some embodiments, an interactive graphical user interface platform 255 of the front-end application computer server 250 (and, in some cases, third-party data) may facilitate forecasts, decisions, predictions, and/or the display of results via one or more remote computers 270 (e.g., to gather additional information about a potential association) and/or the remote administrator computer 230. For example, the remote administrator computer 230 may transmit a selection to automated scoring analysis computer 260. Based on the selection, the automated scoring analysis computer 260 may interact with the front-end application computer server 250 to calculate a risk score that can be returned to the remote administrator computer 230 (after the front-end application computer server 250 transmits additional questions and receives responses as appropriate). Note that the front-end application computer server 250 and/or any of the other devices and methods described herein might be associated with a third party, such as a vendor that performs a service for an enterprise.

The front-end application computer server 250 and/or the other elements of the system 200 might be, for example, associated with a Personal Computer ("PC"), laptop computer, smartphone, an enterprise server, a server farm, and/or a database or similar storage devices. According to some embodiments, an "automated" front-end application computer server 250 (and/or other elements of the system 200) may facilitate analysis of electronic records in the potential association data store 210. As used herein, the term "automated" may refer to, for example, actions that can be performed with little (or no) intervention by a human.

As used herein, devices, including those associated with the front-end application computer server 250 and any other device described herein may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The front-end application computer server 250 may store information into and/or retrieve information from the data stores 210, 220. The potential association data store 210 might, for example, store electronic records representing a plurality of potential associations, each electronic record having a set of attribute values. The potential association data store 210 may also contain information about prior and current interactions with parties, including those associated with remote communication devices. The potential association data store 210 may be locally stored or reside remote from the front-end application computer server 250. As will be described further below, the potential association data store 210 may be used by the front-end application computer server 250 and/or automated scoring analysis computer 260 in connection with an interactive user interface. Although a single front-end application computer server 250 is shown in FIG. 2, any number of such devices may be included. Moreover, various devices described herein might be combined according to embodiments of the present invention. For example, in some embodiments, the front-end application computer server 250 and automated scoring analysis computer 260 might be co-located and/or may comprise a single apparatus.

Figure 3:
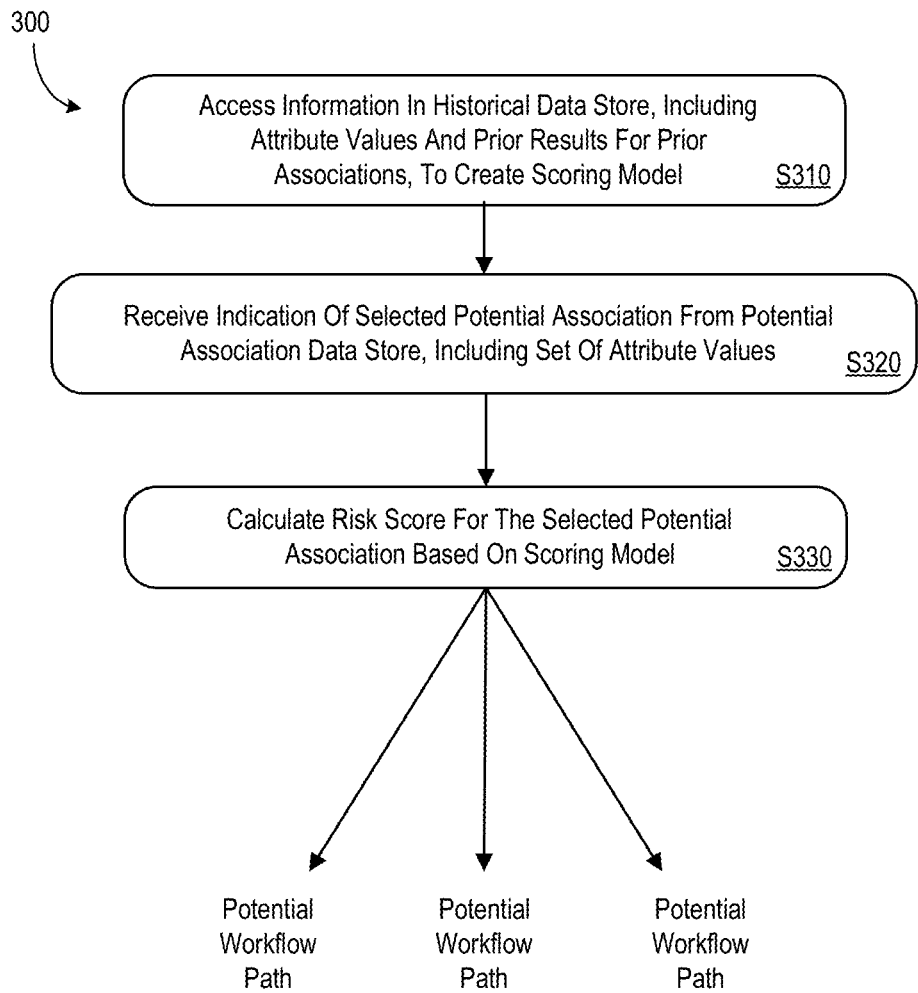
FIG. 3 illustrates a method according to some embodiments of the present invention.

Note that the system 200 of FIG. 2 is provided only as an example, and embodiments may be associated with additional elements or components. According to some embodiments, the elements of the system 200 automatically transmit information associated with an interactive user interface display over a distributed communication network. FIG. 3 illustrates a method 300 that might be performed by some or all of the elements of the system 200 described with respect to FIG. 2, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S310, an automated scoring analysis computer may access information in a historical data store, including sets of attribute values and prior results for a plurality of prior associations, to create a scoring model. According to some embodiments, each electronic record is associated with a potential insurance policy and the scoring model is used to calculated risk score associated with an underwriting grade. In such embodiments, the scoring model might be associated with a predictive model. Note that the scoring model might be associated with quantile bands and/or clustering techniques.

Each potential insurance policy might be associated with, for example, an insurance policy quote, an existing insurance policy, or an insurance policy renewal. At least one of the attribute values of a potential insurance policy might include information about an insured associated with the insurance policy, such as an annual sales amount, an industry classification, prior claim information, etc. Moreover, at least one of the attribute values might include information about the insurance policy, such as a property deductible amount, a business personal property limit, a building limit, a building limit per square foot, etc. According to some embodiments, at least one of the attribute values might include information about a property associated with the insurance policy, such as a construction occupancy protection and exposure attribute, a census attribute, a geography attribute, etc. In still other embodiments, at least one of the attribute values may include information about a location associated with the insurance policy, such as a quality index, an earthquake zone, a wind zone, a sub-wind zone, etc.

At S320, an indication may be received of a selected potential association from a potential association data store, including a set of attribute values. For example, an indication of an electronic record of interest might be associated with an insurance policy search input, such as an insurance policy number, a selected location, an insured name, an insurance policy description, a building identifier, etc.

At S330, the system may calculate a risk score for the selected potential association based on the scoring model. According to some embodiments, the risk score may further be calculated based on third-party data, social media data, location information, business credit information, prior interactions, employee sentiment data, building information, etc.

Depending on the risk score calculated at S330, a front-end application computer server may automatically select a workflow path form a set of potential workflow paths. For example, the front-end application server might modify a set of information requests (or questions) to be transmitted from the enterprise in connection with the selected potential association. The automatic modification of the set of information requests might comprise, for example, removing information requests when the risk score is below a pre-determined threshold value. As another example, the system may automatically arrange to complete the potential association based on the calculated risk score and responses to the modified set of information requests. The automatic completion of the potential association might include, for example:
  completing the potential association when the risk score is below a first pre-determined threshold value;
  preventing the potential association when the risk score is above a second pre-determined threshold value; and
  applying at least one completion rule when the risk score is between the first and second pre-determined threshold values.

Thus, embodiments may provide a streamlined way to process insurance quotes to improve the ease of doing business, allow for expansion in targeted types of business as desired, and/or provide efficient loss cost management. Moreover, a business referral model may quantify the risk of a customer at the first notice of a quote to enable a differentiated quoting process to enhance a customer's experience and improve underwriting quality. The risk score may identify high severity risks to enable triaging of quotes based on the risk level.

Figure 4:
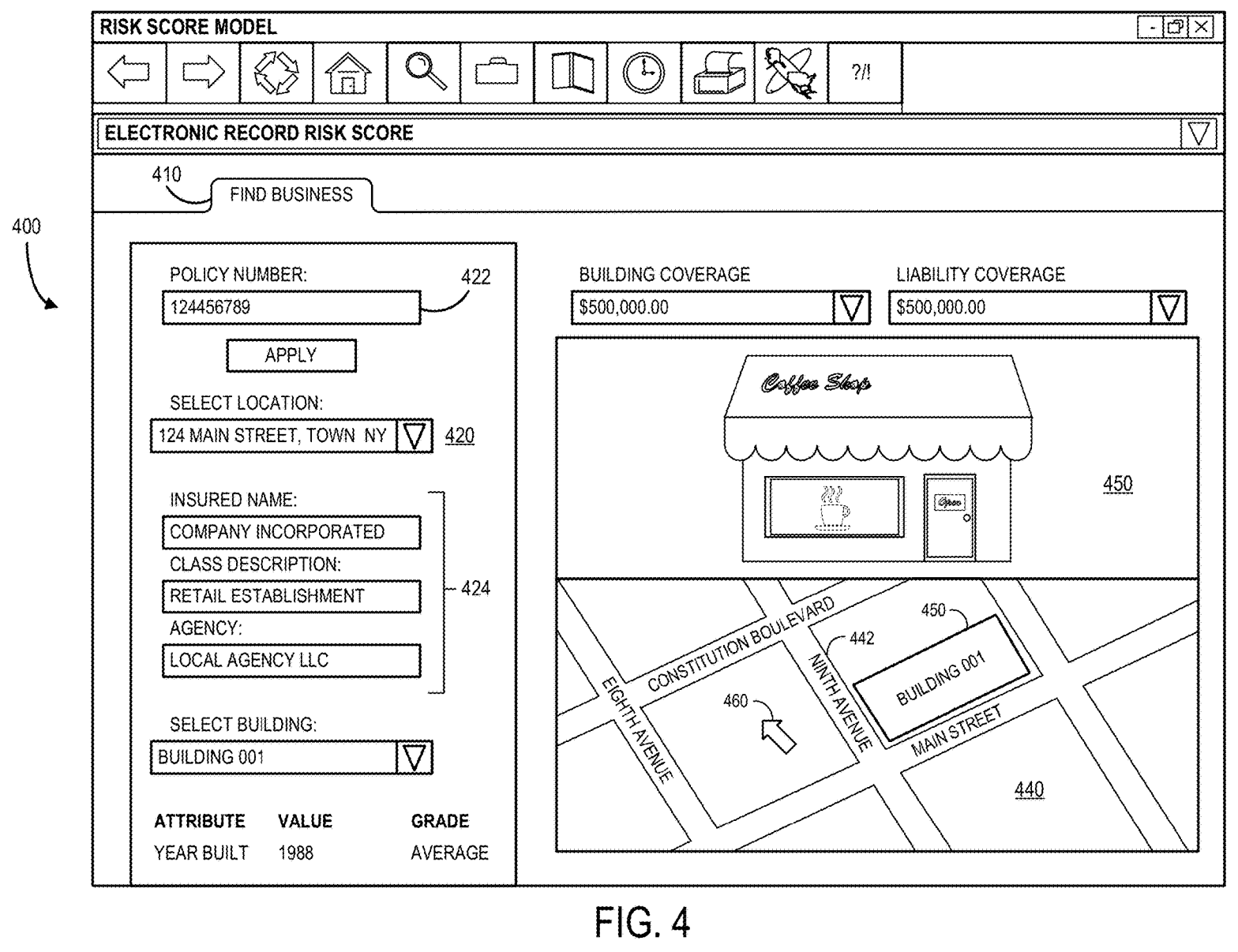

FIG. 4 is an example of an electronic record risk score interactive user display 400 according to some embodiments. The display 400 includes a find business area 410 where an insurance policy number search term may be entered 422 (e.g., to let a user indicate a property of interest), a location may be selected 420, an insured name, class description, and insurance agency 424 may be entered and/or a building identifier may be selected (e.g., "Building 001"). The display 400 may further include modifiable coverage information (e.g., building coverage, liability coverage, etc.). The display 400 also includes a map area 440 that may provide third-party mapping information (e.g., from a GOOGLE® mapping platform) on a street-level 442 basis for the property of interest 450. A display pointer 460 might be used in the map area 440 to dynamically re-center the display, zoom in or out, etc. According to some embodiments, the display further includes an image of insured property.

Figure 5:
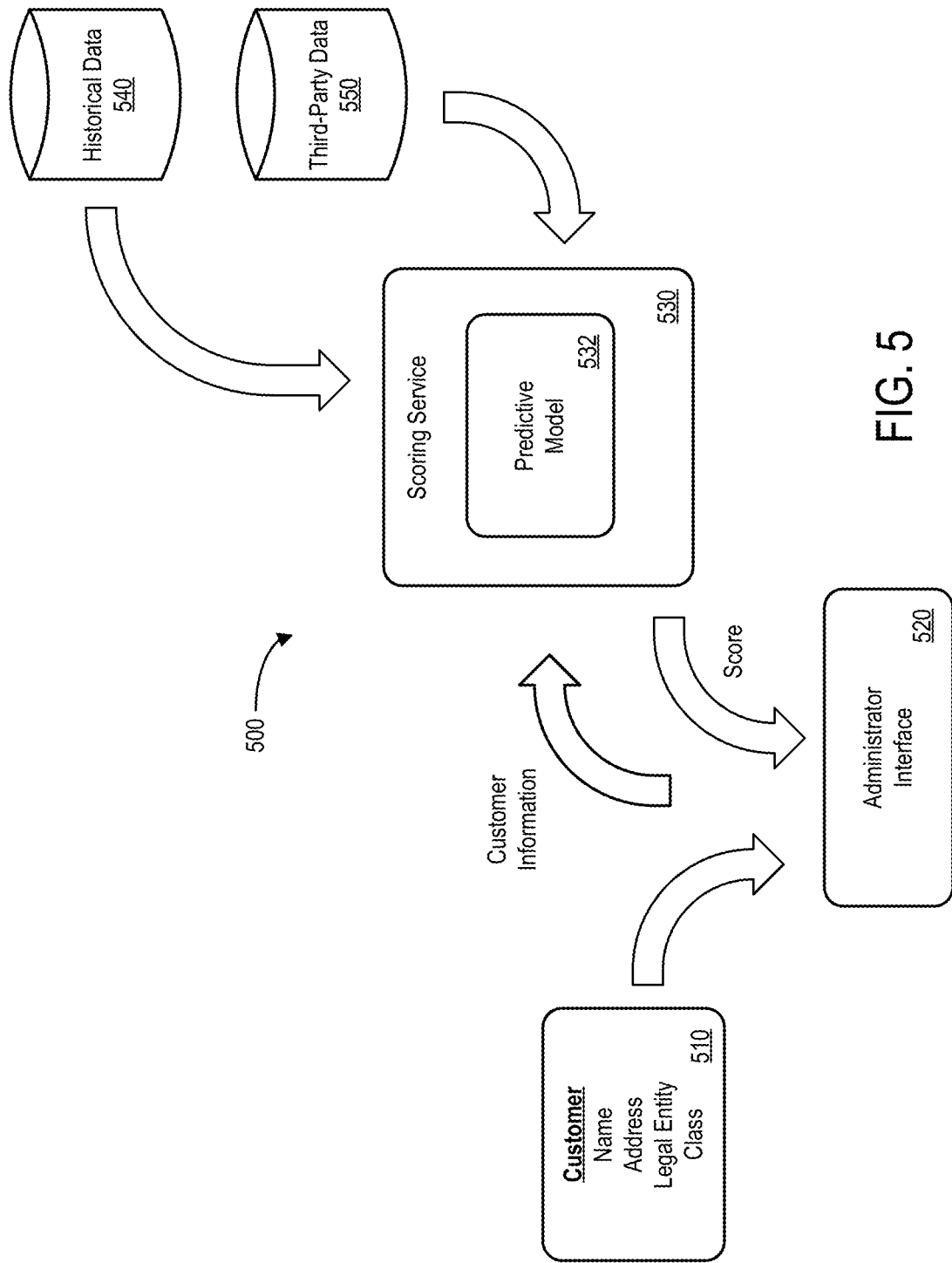
FIG. 5 is a high-level block diagram of an insurance underwriting system according to some embodiments.

FIG. 5 is a high-level block diagram of an insurance underwriting system 500 according to some embodiments. The system 500 includes customer data 510 such as name, address, legal entity, and class (which might be pre-filled by the system but open to modification). The customer data 510 is sent to a scoring service 530 via an administrator interface 520. The scoring service 530 may use historical data 540, such as prior quotes, premiums, etc. and third-party data 550, such as crime data, education data, sales data, population density data, social media information, industry codes, credit information, employee count data, Uniform Commercial Code ("UCC") information, etc. to calculate a risk score that is returned via the administrator interface 520.

According to some embodiments, the scoring service 530 might incorporate a predictive model 532. The predictive model 532 might use the historical data 540 to provide insight into which risks are more (or less) likely to have large losses. The predictive model 532 may quantify the probability of a risk have aggregate losses exceeding a predetermined threshold and might incorporate, according to some embodiments, logistic regression and training data. The predictive model might also identify high-risk segments that are heavily underwritten (to quantify the probability of a quote being underwritten). The risk score generated by the scoring service 530 might then be used to suppress follow-up information requests (as being unnecessary for relatively low risk customers) and/or to implement (or prohibit) an automated process. The underwriting model 534 might incorporate, according to some embodiments, logistic regression and training data (based on quotes by line of business).

Figure 6:
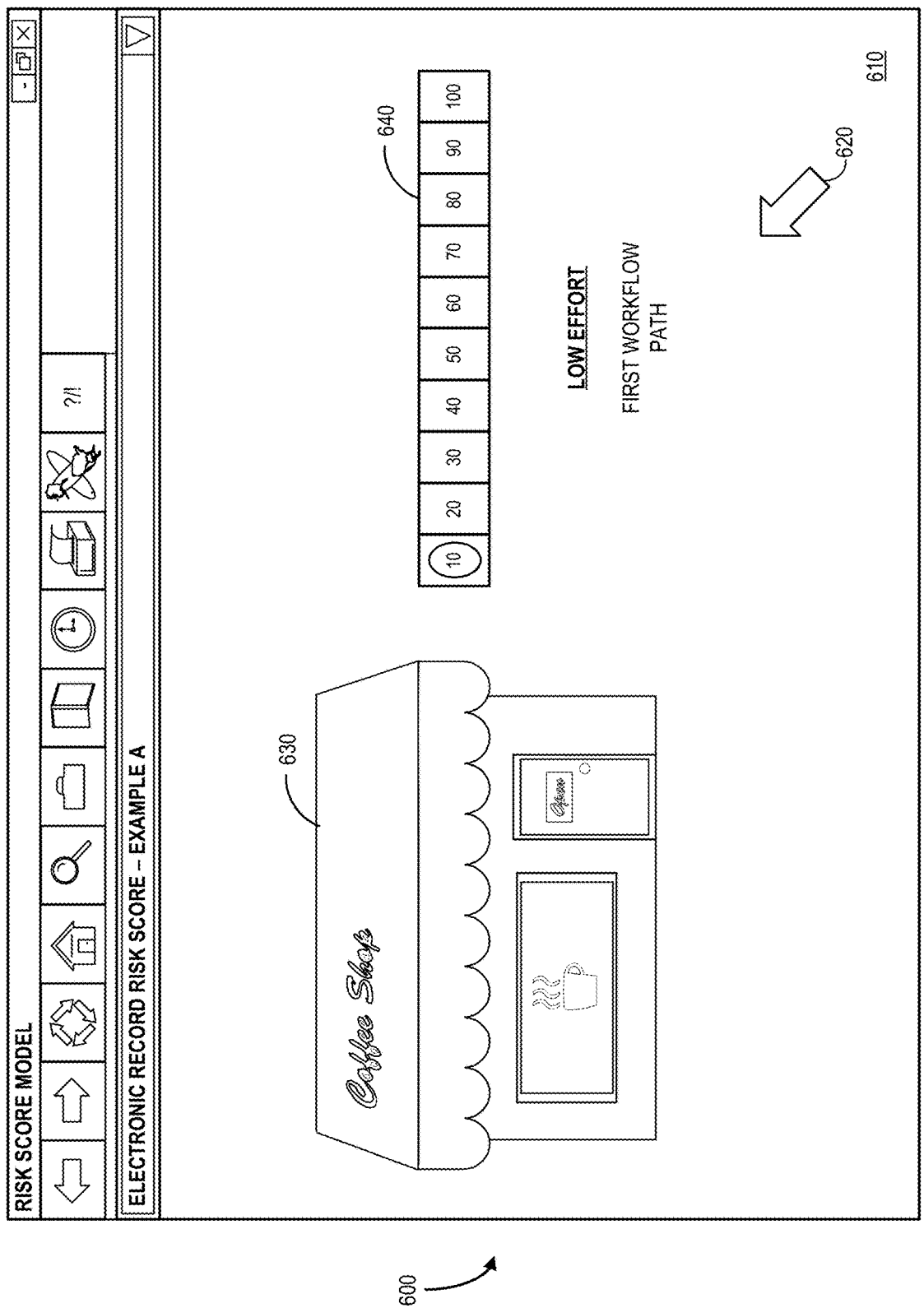
FIGS. 6 and 7 are examples of risk scores according to some embodiments.
Figure 7:
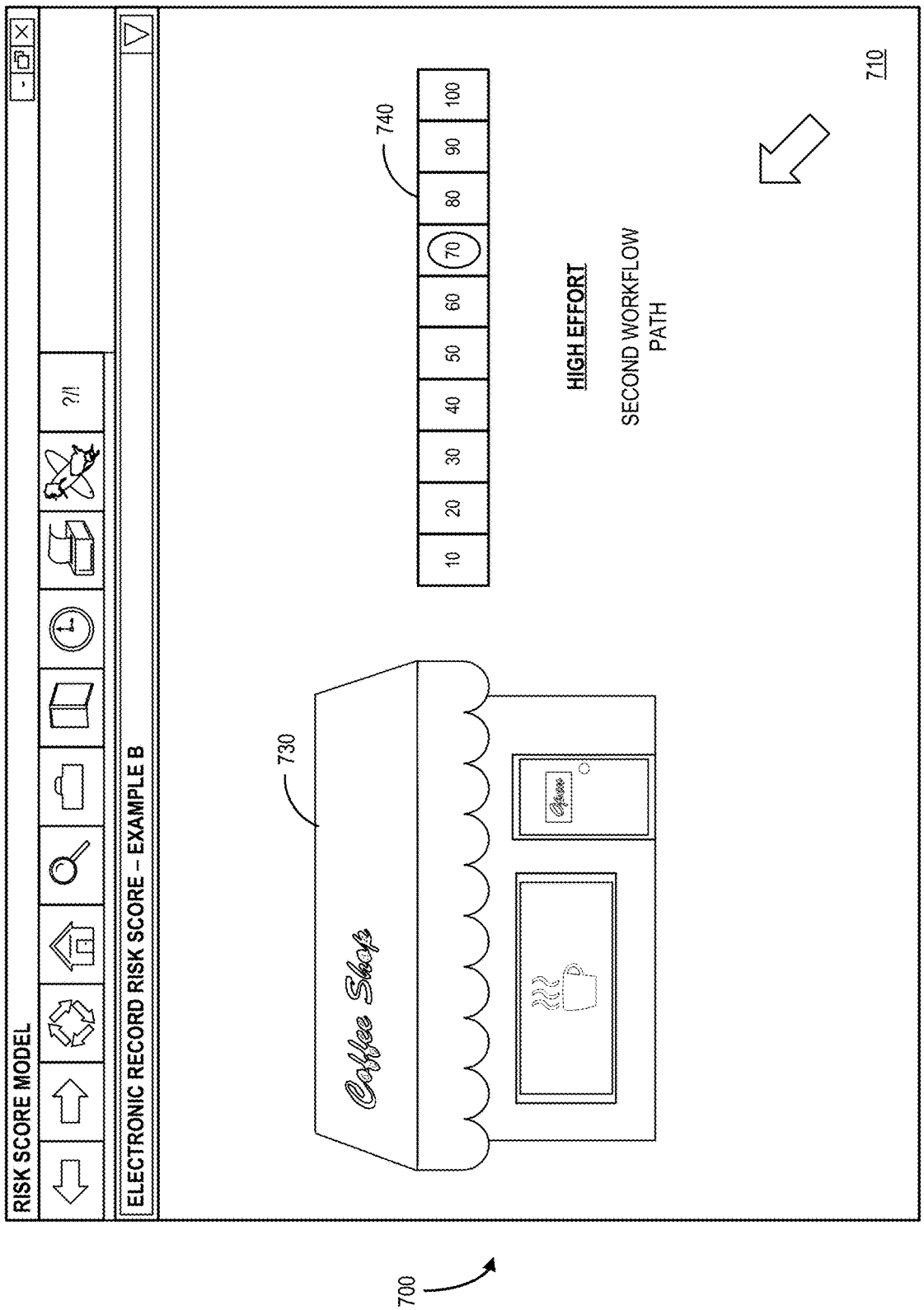

FIGS. 6 and 7 are examples of risk scores according to some embodiments. In particular, FIG. 6 illustrates 600 a display 610 for a business with a risk score 640 of "10" (on a scale from 1, representing lowest risk, to 100, representing highest risk). As a result, the business is classified as "low effort" and a first workflow path is selected. Note that a computer pointer 620 might be used to select elements of the display 610 to receive additional information about those elements (e.g., how the risk score 640 was calculated). The display 610 further includes an image 630 of the business. Note that the first workflow path may improve yield (allowing for winning more lower risk business) and the streamlined ease of the system may drive more quotes. As another example, FIG. 7 illustrates 700 a display 710 for a business with a risk score 740 of "70." As a result, the business is classified as "higher effort" and a second workflow path is selected. For example, the quote might require manual underwriter review.

Figure 8:
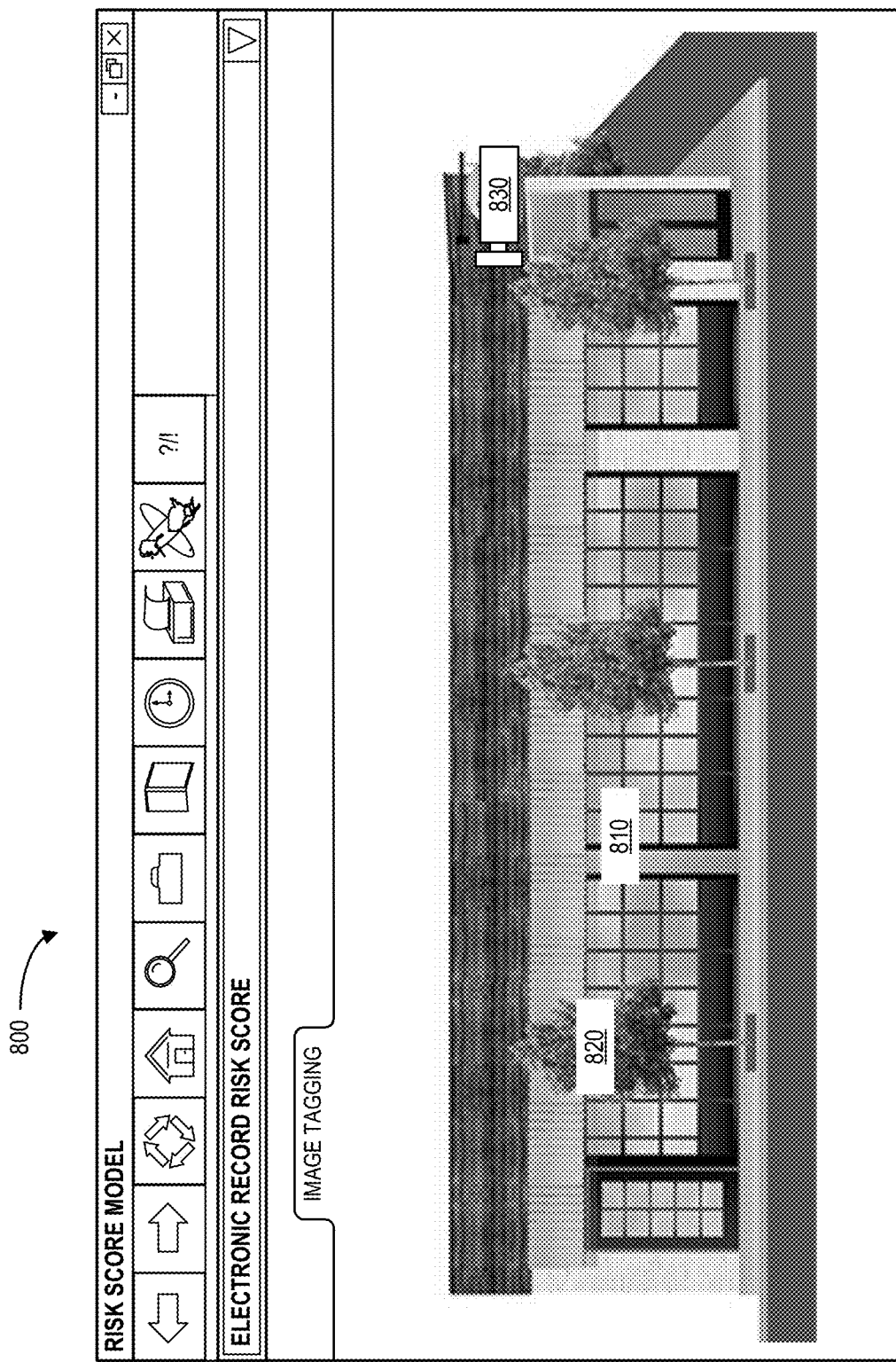
FIGS. 8 and 9 illustrate the use of image tagging in accordance with some embodiments.
Figure 9:
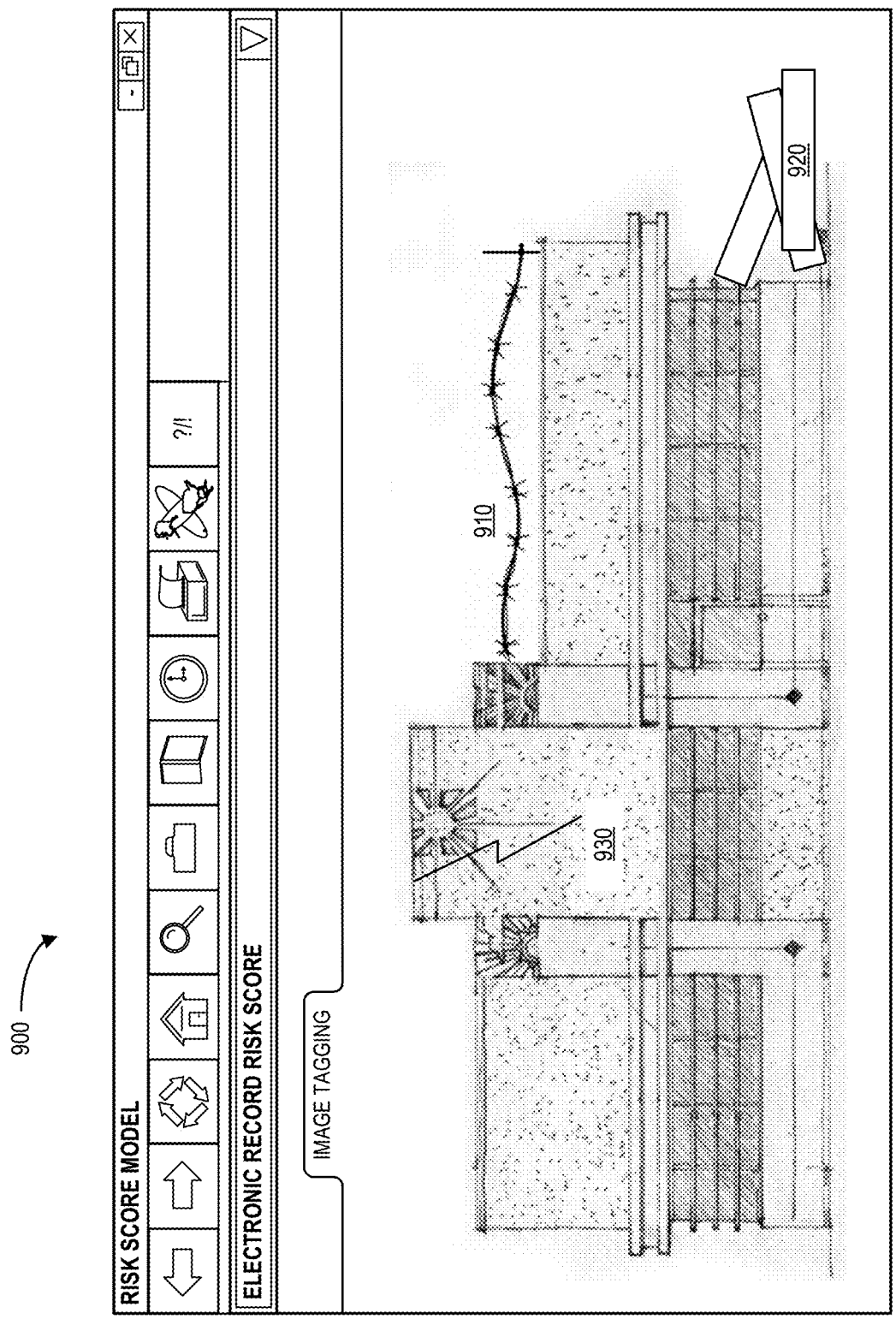

Note that the display 710 further includes an image 730 of the business. According to some embodiments, a risk score is further calculated based on results of an automated image recognition process. For example, FIGS. 8 and 9 illustrate the use of image tagging in accordance with some embodiments. In particular, FIG. illustrates 800 an image that has been automatically tagged as "acceptable" because of exterior building maintenance 810, high quality landscaping 820, and security lighting or cameras 830. In contrast, FIG. 9 illustrates 900 an image that has been automatically tagged as "unacceptable" because of barbed wire on the property 910, the storage of pallets outside 920, and poor building maintenance 930.

Figure 10:
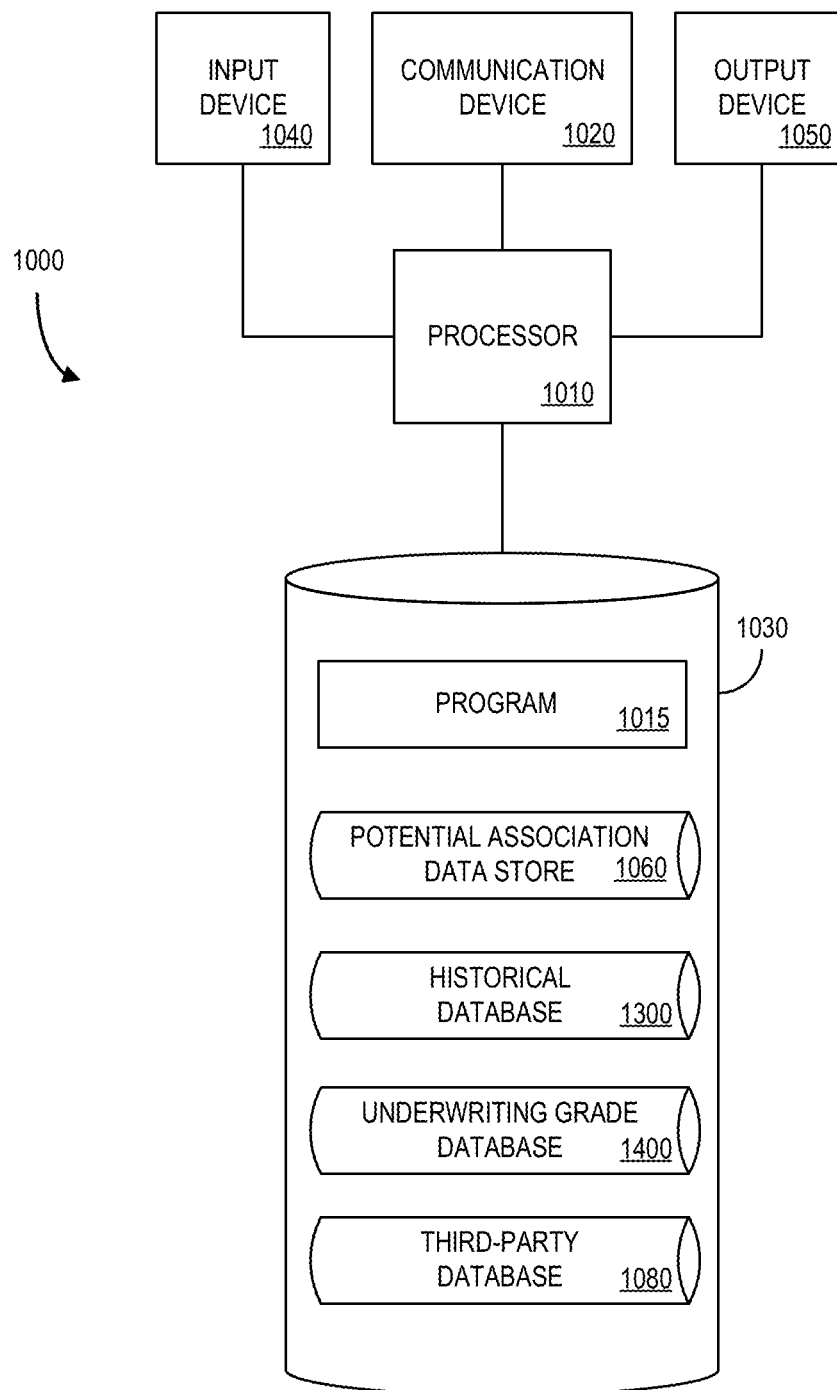
FIG. 10 is a block diagram of an apparatus in accordance with some embodiments of the present invention.

The embodiments described herein may be implemented using any number of different hardware configurations. For example, FIG. 10 illustrates an apparatus 1000 that may be, for example, associated with the systems 200, 500 described with respect to FIGS. 2 and 5, respectively. The apparatus 1000 comprises a processor 1010, such as one or more commercially available Central Processing Units ("CPUs") in the form of one-chip microprocessors, coupled to a communication device 1020 configured to communicate via a communication network (not shown in FIG. 10). The communication device 1020 may be used to communicate, for example, with one or more remote administrator computers and or communication devices (e.g., PCs and smartphones). Note that communications exchanged via the communication device 1020 may utilize security features, such as those between a public internet user and an internal network of the insurance enterprise. The security features might be associated with, for example, web servers, firewalls, and/or PCI infrastructure. The apparatus 1000 further includes an input device 1040 (e.g., a mouse and/or keyboard to enter information about properties, mapping data, historic information, predictive models, etc.) and an output device 1050 (e.g., to output reports regarding underwriting decisions and recommendations).

The processor 1010 also communicates with a storage device 1030. The storage device 1030 may comprise any appropriate information storage device, including combinations of magnetic storage devices (e.g., a hard disk drive), optical storage devices, mobile telephones, and/or semiconductor memory devices. The storage device 1030 stores a program 1015 and/or a risk evaluation tool or application for controlling the processor 1010. The processor 1010 performs instructions of the program 1015, and thereby operates in accordance with any of the embodiments described herein. For example, the processor 1010 may access information in a historical data store or database 1100, including sets of attribute values and prior results for a plurality of prior associations, to create a scoring model. An indication of a selected potential association from a potential association data store 1060 may be received, including a set of attribute values. The processor 1010 may then calculate a risk score for the selected potential association based on the scoring model. The processor 1010 may automatically select a workflow from a plurality of potential workflows (e.g., the processor might modify a set of information requests to be transmitted from the enterprise and/or also automatically arrange to complete the potential association based on the calculated risk score and responses to the modified set of information requests).

The program 1015 may be stored in a compressed, uncompiled and/or encrypted format. The program 1015 may furthermore include other program elements, such as an operating system, a database management system, and/or device drivers used by the processor 1010 to interface with peripheral devices.

As used herein, information may be "received" by or "transmitted" to, for example: (i) the front-end application computer server 1000 from another device; or (ii) a software application or module within the front-end application computer server 1000 from another software application, module, or any other source.

In some embodiments (such as shown in FIG. 10), the storage device 1030 further stores the potential association data store 1060, the historical database 1100 (e.g., associated with a set of destination communication addresses, attribute variables, etc.), an underwriting grade database 1200, and a third-party database 1080. Examples of databases that might be used in connection with the apparatus 1000 will now be described in detail with respect to FIGS. 11 and 12. Note that the databases described herein are only examples, and additional and/or different information may be stored therein. Moreover, various databases might be split or combined in accordance with any of the embodiments described herein. For example, the historical database 1100 and/or underwriting grade database 1200 might be combined and/or linked to each other within the program 1015.

Figure 11:
FIG. 11 is a portion of a tabular historical database in accordance with some embodiments.

Referring to FIG. 11, a table is shown that represents the historical database 1100 that may be stored at the apparatus 1000 according to some embodiments. The table may include, for example, entries associated with properties previously evaluated by an underwriter. The table may also define fields 1102, 1104, 1106, 1108, 1110, 1112 for each of the entries. The fields 1102, 1104, 1106, 1108, 1110, 1112 may, according to some embodiments, specify: an insurance policy identifier 1102, a customer identifier 1104, an attribute 1106, an attribute value 1108, a risk score 1110, and prior claim information 1112. The historical database 1100 may be created and updated, for example, based on information electrically received from various computer systems, including third-party applications.

The insurance policy identifier 1102 may be, for example, a unique alphanumeric code identifying an insurance policy that may be reviewed by an underwriter. According to some embodiments, the insurance policy identifier 1102 might be associated with the insurance policy number search box 422 described with respect to FIG. 4. The customer identifier 1104 may, according to some embodiments, identify a party seeking an insurance quote. The attribute 1106 may represent a type of parameter associated with the policy identifier 1102 (e.g., geographic information, census data, etc.). The attribute value 1108 may represent the actual value of the attribute 1106 (e.g., as determined during an insurance policy quote process). Note that although a single attribute 1106 and associated value 1108 are shown in FIG. 11 for each insurance policy, in actuality many different pairs of data might be utilized. The risk score 1110 might represent, for example, a grade, category, numerical value, rank, etc. indicating an amount of risk that might be associated with the policy identifier 1102 with respect to applicable attributes 1106. The prior claim information 1112 might indicate a number of insurance claims and/or an overall amount of losses associated with the insurance policy.

Figure 12:
FIG. 12 is a portion of an underwriting grated database according to some embodiments.

Referring to FIG. 12, a table is shown that represents the underwriting grade database 1200 that may be stored at the apparatus 1000 according to some embodiments. The table may include, for example, entries associated with properties to be evaluated by an underwriter. The table may also define fields 1202, 1204, 1206, 1208, 1210 for each of the entries. The fields 1202, 1204, 1206, 1208, 1210 may, according to some embodiments, specify: an insurance policy identifier 1202, a customer identifier 1204, an attribute 1206, an attribute value 1208, and a risk score 1210. The underwriting grade database 1200 might be created and/or updated based on information received from various computer systems, including third-party applications, during an insurance quote process.

The insurance policy identifier 1202 may be, for example, a unique alphanumeric code identifying an insurance policy that may be reviewed by an underwriter. According to some embodiments, the insurance policy identifier 1202 might be associated with the insurance policy number search box 422 described with respect to FIG. 4. The customer identifier 1204 may, according to some embodiments, identify a party seeking an insurance quote. The attribute 1206 may represent a type of parameter associated with the policy identifier 1202 (e.g., geographic information, census data, etc.). The attribute value 1208 may represent the actual value of the attribute 1206 (e.g., as determined during an insurance policy quote process). The attribute value risk score 1210 might represent, for example, a grade, category, numerical value, rank, etc. indicating an amount of risk that might be associated with the policy identifier 1202 with respect to that set of attributes 1206. The risk score 1210 might be used to select an appropriate workflow path, initiate an electronic flag or message, etc.

Figure 13:
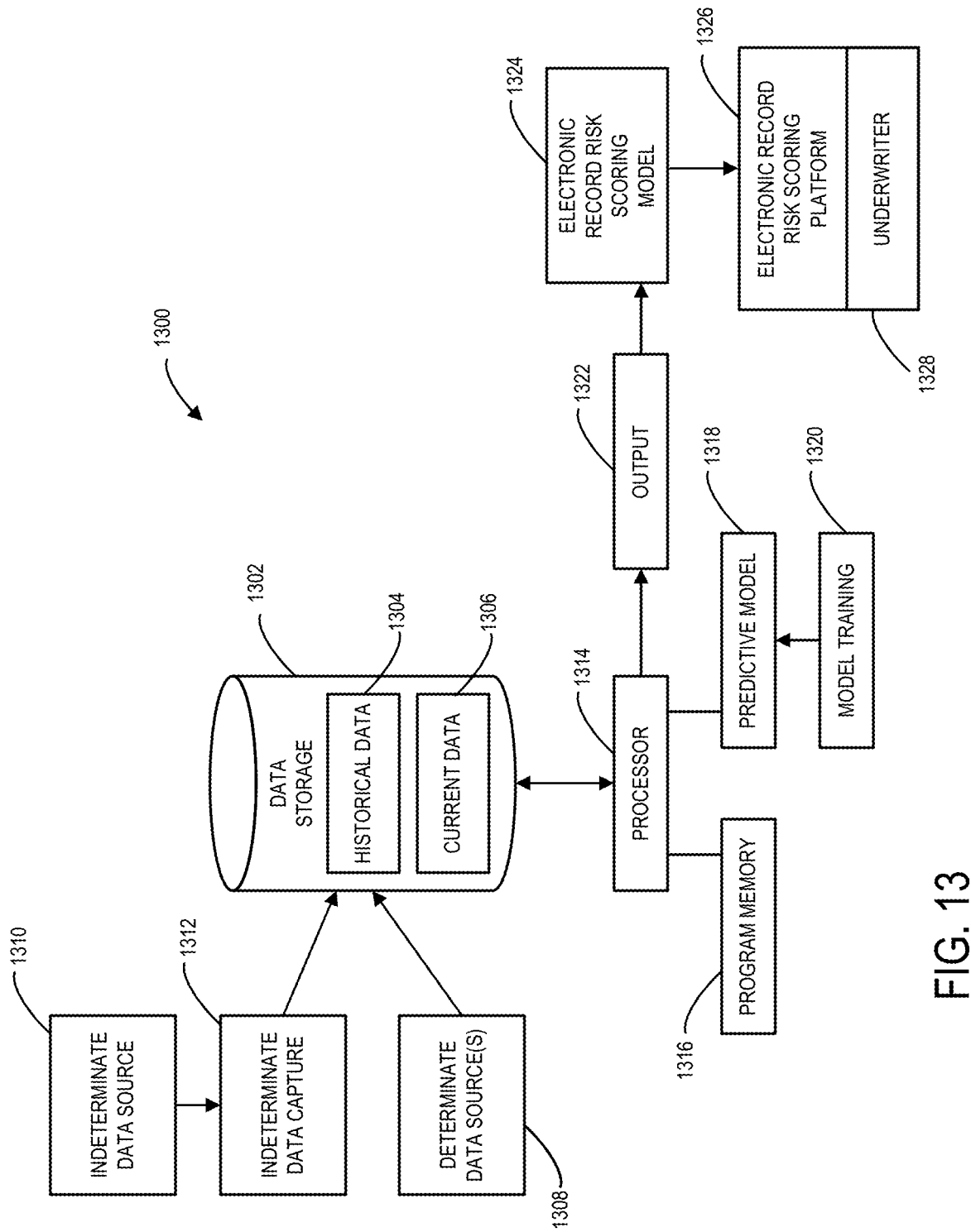
FIG. 13 illustrates a system having a predictive model in accordance with some embodiments.

According to some embodiments, one or more predictive models may be used to predict or forecast future events. Features of some embodiments associated with a predictive model will now be described by first referring to FIG. 13. FIG. 13 is a partially functional block diagram that illustrates aspects of a computer system 1300 provided in accordance with some embodiments of the invention. For present purposes it will be assumed that the computer system 1300 is operated by an insurance company (not separately shown) for the purpose of supporting an insurance underwriting process (e.g., to help accurately make decisions regarding insurance risk, coverages, etc.).

The computer system 1300 includes a data storage module 1302. In terms of its hardware the data storage module 1302 may be conventional, and may be composed, for example, by one or more magnetic hard disk drives. A function performed by the data storage module 1302 in the computer system 1300 is to receive, store and provide access to both historical transaction data (reference numeral 1304) and current transaction data (reference numeral 1306). As described in more detail below, the historical transaction data 1304 is employed to train a predictive model to provide an output that indicates an identified performance metric and/or an algorithm to risk score performance factors, and the current transaction data 1306 is thereafter analyzed by the predictive model. Moreover, as time goes by, and results become known from processing current transactions (e.g., underwriting, clustering, and/or attribute grading decisions), at least some of the current transactions may be used to perform further training of the predictive model. Consequently, the predictive model may thereby appropriately adapt itself to changing conditions.

Either the historical transaction data 1304 or the current transaction data 1306 might include, according to some embodiments, determinate and indeterminate data. As used herein and in the appended claims, "determinate data" refers to verifiable facts such as the age of a building; a property size; a policy date or other date; a driver age; a time of day; a day of the week; a geographic location, address or ZIP code; and a policy number.

As used herein, "indeterminate data" refers to data or other information that is not in a predetermined format and/or location in a data record or data form. Examples of indeterminate data include narrative speech or text, information in descriptive notes fields and signal characteristics in audible voice data files.

The determinate data may come from one or more determinate data sources 1308 that are included in the computer system 1300 and are coupled to the data storage module 1302. The determinate data may include "hard" data like an insured or claimant name, type of business, industry classification code, policy number, address, an underwriter decision, etc. One possible source of the determinate data may be the insurance company's insurance policy database (not separately indicated).

The indeterminate data may originate from one or more indeterminate data sources 1310, and may be extracted from raw files or the like by one or more indeterminate data capture modules 1312. Both the indeterminate data source(s) 1310 and the indeterminate data capture module(s) 1312 may be included in the computer system 1300 and coupled directly or indirectly to the data storage module 1302. Examples of the indeterminate data source(s) 1310 may include data storage facilities for document images, for text files, and digitized recorded voice files. Examples of the indeterminate data capture module(s) 1312 may include one or more optical character readers, a speech recognition device (i.e., speech-to-text conversion), a computer or computers programmed to perform natural language processing, a computer or computers programmed to identify and extract information from narrative text files, a computer or computers programmed to detect key words in text files, and a computer or computers programmed to detect indeterminate data regarding an individual.

The computer system 1300 also may include a computer processor 1314. The computer processor 1314 may include one or more conventional microprocessors and may operate to execute programmed instructions to provide functionality as described herein. Among other functions, the computer processor 1314 may store and retrieve historical insurance transaction data 1304 and current transaction data 1306 in and from the data storage module 1302. Thus, the computer processor 1314 may be coupled to the data storage module 1302.

The computer system 1300 may further include a program memory 1316 that is coupled to the computer processor 1314. The program memory 1316 may include one or more fixed storage devices, such as one or more hard disk drives, and one or more volatile storage devices, such as RAM devices. The program memory 1316 may be at least partially integrated with the data storage module 1302. The program memory 1316 may store one or more application programs, an operating system, device drivers, etc., all of which may contain program instruction steps for execution by the computer processor 1314.

The computer system 1300 further includes a predictive model component 1318. In certain practical embodiments of the computer system 1300, the predictive model component 1318 may effectively be implemented via the computer processor 1314, one or more application programs stored in the program memory 1316, and computer stored as a result of training operations based on the historical transaction data 1304 (and possibly also data received from a third party). In some embodiments, data arising from model training may be stored in the data storage module 1302, or in a separate computer store (not separately shown). A function of the predictive model component 1318 may be to determine appropriate underwriting, clustering, and/or attribute grading decisions for one or more potential insurance policies. The predictive model component may be directly or indirectly coupled to the data storage module 1302.

The predictive model component 1318 may operate generally in accordance with conventional principles for predictive models, except, as noted herein, for at least some of the types of data to which the predictive model component is applied. Those who are skilled in the art are generally familiar with programming of predictive models. It is within the abilities of those who are skilled in the art, if guided by the teachings of this disclosure, to program a predictive model to operate as described herein.

Still further, the computer system 1300 includes a model training component 1320. The model training component 1320 may be coupled to the computer processor 1314 (directly or indirectly) and may have the function of training the predictive model component 1318 based on the historical transaction data 1304 and/or information about potential insureds. (As will be understood from previous discussion, the model training component 1320 may further train the predictive model component 1318 as further relevant data becomes available.) The model training component 1320 may be embodied at least in part by the computer processor 1314 and one or more application programs stored in the program memory 1316. Thus, the training of the predictive model component 1318 by the model training component 1320 may occur in accordance with program instructions stored in the program memory 1316 and executed by the computer processor 1314.

In addition, the computer system 1300 may include an output device 1322. The output device 1322 may be coupled to the computer processor 1314. A function of the output device 1322 may be to provide an output that is indicative of (as determined by the trained predictive model component 1318) particular clustering, attribute grade, and/or underwriting decisions, etc. The output may be generated by the computer processor 1314 in accordance with program instructions stored in the program memory 1316 and executed by the computer processor 1314. More specifically, the output may be generated by the computer processor 1314 in response to applying the data for the current simulation to the trained predictive model component 1318. The output may, for example, be a numerical estimate and/or likelihood within a predetermined range of numbers. In some embodiments, the output device may be implemented by a suitable program or program module executed by the computer processor 1314 in response to operation of the predictive model component 1318.

Still further, the computer system 1300 may include an electronic record risk scoring model module 1324. The electronic record risk scoring model module 1324 may be implemented in some embodiments by a software module executed by the computer processor 1314. The electronic record risk scoring model module 1324 may have the function of rendering a portion of the display on the output device 1322 (e.g., an interactive user display including attribute grades, mapping information, geo cohort data, etc.). Thus, the electronic record risk scoring model module 1324 may be coupled, at least functionally, to the output device 1322. In some embodiments, for example, the electronic record risk scoring model module 1324 may report results and/or predictions by routing, to an underwriter 1328 via an electronic record risk scoring platform 1326, follow-up underwriting questions, and/or insurance decisions generated by the predictive model component 1318. In some embodiments, this information may be provided to an underwriter 1328 who may also be tasked with determining whether or not the results may be improved (e.g., by further adjusting the models).

In some embodiments described herein, a predictive model may use information obtained during an insurance quote process (e.g., describing a property, a type of business, etc.) to assign a risk score to a potential insurance policy. Note, however, that a predictive model may receive other inputs and/or generate other outputs in accordance with embodiments described herein. For example, a predictive model might receive historic claim information (e.g., associated with other insurance policies within a cluster). According to some embodiments, the predictive model might be run using several different alternate sets of input values and generate predication for each of those scenarios.

Thus, embodiments may provide an automated and efficient way to generate attribute analysis risk scores for a potential insurance policy to help an underwriter make better decisions. Embodiments may also address the need for a consistent and objective determination of how a potential insurance policy should be evaluated.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 14:
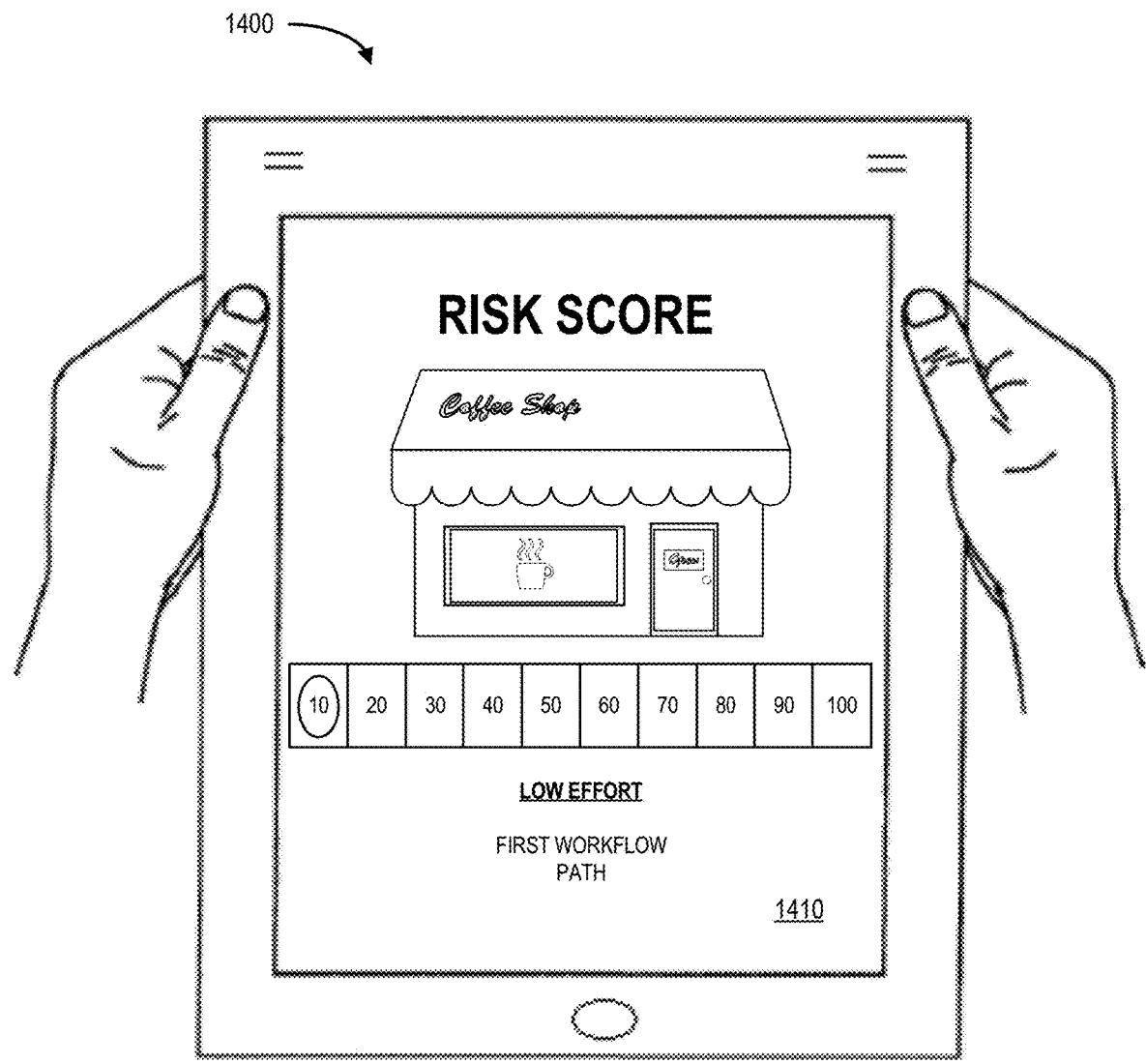
FIG. 14 illustrates a tablet computer displaying a resource allocation user interface according to some embodiments.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to particular types of insurance policies, embodiments may instead be associated with other types of insurance policies in additional to and/or instead of the policies described herein (e.g., business insurance policies, automobile insurance policies, etc.). Similarly, although a certain number of attribute grades were described in connection some embodiments herein, other numbers of grades might be used instead. Still further, the displays and devices illustrated herein are only provided as examples, and embodiments may be associated with any other types of user interfaces. For example, FIG. 14 illustrates a handheld tablet computer 1600 showing a risk score display 1410 according to some embodiments. The risk score display 1410 might include user-selectable data that can be selected and/or modified by a user of the handheld computer 1400.

Figure 15:
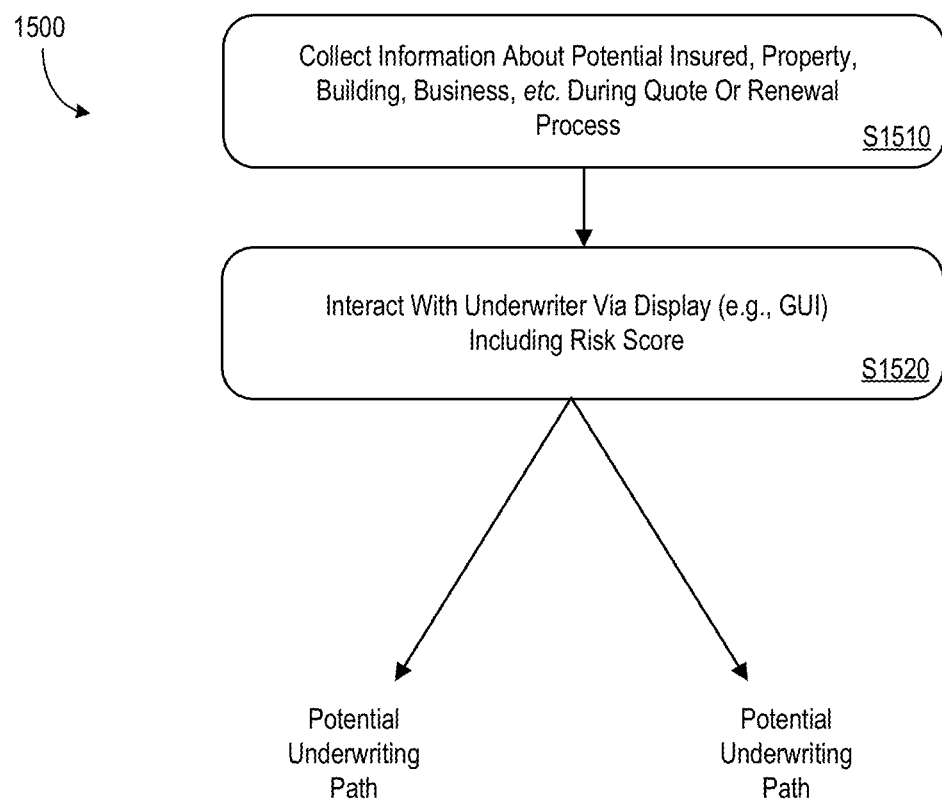
FIG. 15 illustrates an overall process in accordance with some embodiments.

FIG. 15 illustrates an overall process 1500 in accordance with some embodiments. At S1510, information about a potential insured, property, building, business, etc. may be collected during an insurance quote or renew process. This information might be gathered, for example, via an interview, telephone call, web-based form, etc. At S1520, the system may interact with an underwriter via an electronic record risk display (e.g., associated with an interactive GUI). The system may then automatically select a workflow path from a plurality of potential workflow paths (e.g., by modifying and information exchange or automatically completing an association). Note that the interactions with the customer and/or an underwriter might be transmitted directly to the potential insured or instead be provided via an insurance agent, a sales representative, a customer service manager, etc.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A computer system of an enterprise, comprising:
(a) a potential association data store containing electronic records representing a plurality of potential associations for properties, each property having a building, and the enterprise and, for each potential association, an electronic record identifier and a set of attribute values;
(b) a historical data store containing electronic records representing prior associations with the enterprise and, for each prior association, an electronic record identifier, a set of attribute values, and at least one prior result;
(c) a model training computer to access information in the historical data store, including sets of attribute values and prior results for a plurality of prior associations, to train a predictive scoring model with historic insurance claim information associated insurance policies along with third-party data and transmit the trained predictive scoring model to an automated scoring analysis computer;
(d) the automated scoring analysis computer, coupled to the potential association data store and the historical data store, including:

a first computer processor, and
a first computer memory, coupled to the first computer processor, storing instructions that, when executed by the first computer processor, cause the automated scoring analysis computer to:
(i) access, via an encrypted database management system, information in the potential association data store, including sets of attribute values,
(ii) receive an indication of a selected potential association in the potential association data store, including the set of attribute values,
(iii) calculate a risk score for the selected potential association, representing a risk of loss for a property, based on all of: the trained predictive scoring model, social media data of the property, third-party data, location information, and information about the building, including a building limit per square foot, and
(iv) output an indication of the calculated risk score;
(e) the front-end application computer server, coupled to the automated scoring analysis computer, including:
a second computer processor, and
a second computer memory, coupled to the second computer processor, storing instructions that, when executed by the second computer processor, cause the front-end application computer server to:
(v) receive the indication of the calculated risk score for the selected potential association,
(vi) automatically select a workflow path from a plurality of potential workflow paths based on the indication of the calculated risk score,
(vii) execute the selected workflow path by modifying a set of information requests including the automatic removal of information requests transmitted from the enterprise when the calculated risk score is below a pre-determined threshold value and the automatic completion of the potential association based on the calculated risk score and responses received in association with the modified set of information requests, and
(viii) transmit training information to the model training computer to adapt the trained predictive scoring model to changing conditions; and
(f) a communication port coupled to the front-end application computer server to transmit data for an interactive user interface display in accordance with the selected workflow path via security features and a distributed communication network, wherein the selected workflow path reduces an overall number of electronic messages transmitted by omitting a subset of information request messages transmitted via the communication port when the calculated risk score is below the pre-determined threshold value,
and further wherein the interactive user interface display includes all of: (1) an image of the property and building, (2) a linear graphical representation of the calculated risk score, and (3) an indication of the selected workflow path.

2. The system of claim 1, wherein the risk score is further calculated based on results of an automated image recognition process.

3. The system of claim 1, wherein the predictive scoring model utilizes at least one of: (i) quantile bands, and (ii) clustering.

4. The system of claim 1, wherein the selected workflow path includes completing the potential association when the risk score is below a first pre-determined threshold value, preventing the potential association when the risk score is above a second pre-determined threshold value, and applying at least one completion rule when the risk score is between the first and second pre-determined threshold values.

5. The system of claim 1, wherein each electronic record represents a potential insurance policy and the calculated risk score comprises an underwriting grade indicating a risk of loss for a property and building covered by the potential insurance policy.

6. The system of claim 5, wherein each potential insurance policy at least one of: (i) an insurance policy quote, (ii) an existing insurance policy, and (iii) an insurance policy renewal.

7. The system of claim 5, wherein an indication of an electronic record of interest is returned as a result of an insurance policy search input.

8. The system of claim 7, wherein the insurance policy search input comprises at least one of: (i) an insurance policy number, (ii) a selected location, (iii) an insured name, (iv) an insurance policy description, and (v) a building identifier.

9. The system of claim 5, wherein at least one of the attribute values comprises information about an insured covered by the insurance policy, including at least one of: (i) an annual sales amount, (ii) an industry classification, and (iii) prior claim information.

10. The system of claim 5, wherein the attribute values include all of: (i) a property deductible amount and (ii) a business personal property limit.

11. The system of claim 5, wherein the attribute values include all of: (i) a construction occupancy protection and exposure attribute, (ii) a census attribute, and (iii) a geography attribute.

12. The system of claim 5, wherein at least one of the attribute values comprises information about a location covered by the insurance policy, including at least one of: (i) a quality index, (ii) an earthquake zone, (iii) a wind zone, (iv) a sub-wind zone, and (v) a flood zone.

13. A computerized method of an enterprise, comprising:
accessing, by a model training computer, information in a historical data store containing electronic records representing prior associations with the enterprise and, for each prior association, an electronic record identifier, a set of attribute values, and at least one prior result, wherein the information accessed by the model training computer includes sets of attribute values and prior results for a plurality of prior associations;
training, by the model training computer, a predictive scoring model with historic insurance claim information associated insurance policies along with third-party data;
transmitting the trained predictive scoring model from the model training computer to an automated scoring analysis computer;
accessing, by a computer processor of the automated scoring analysis computer via an encrypted database management system, information in the potential association data store, including sets of attribute values, wherein the potential association data store contains electronic records representing a plurality of potential associations for properties, each property having a building, and the enterprise and, for each potential association, an electronic record identifier and a set of attribute values;
receiving, by a computer processor of the automated scoring analysis computer, an indication of a selected potential association in the potential association data store, including the set of attribute values;
calculating, by the computer processor of the automated scoring analysis computer, a risk score for the selected potential association, representing a risk of loss for a property, based on all of: the trained predictive scoring model, social media data of the property, third-party data, location information, and information about the building, including a building limit per square foot;
outputting, by the computer processor of the automated scoring analysis computer, an indication of the calculated risk score;
receiving, by a computer processor of a back-end application computer server, the indication of the calculated risk score for the selected potential association;
automatically selecting, by the computer processor of the back-end application computer server, a workflow path from a plurality of potential workflow paths based on the indication of the calculated risk score;
executing, by the computer processor of the back-end application computer server, the selected workflow path by modifying a set of information requests including the automatic removal of information requests transmitted from the enterprise when the calculated risk score is below a pre-determined threshold value and the automatic completion of the potential association based on the calculated risk score and responses received in association with the modified set of information requests;
transmitting, by the computer processor of the back-end application computer server, training information to the model training computer to adapt the trained predictive scoring model to changing conditions; and
supporting an interactive user interface display in accordance with the selected workflow path via security features and a distributed communication network, wherein the selected workflow path reduces an overall number of electronic messages transmitted by omitting a subset of information request messages transmitted via the communication port when the calculated risk score is below the pre-determined threshold value,
and further wherein the interactive user interface display includes all of: (1) an image of the property and building, (2) a linear graphical representation of the calculated risk score, and (3) an indication of the selected workflow path.

14. The method of claim 13, wherein the risk score is further calculated based on results of an automated image recognition process.

15. The method of claim 13, wherein the predictive scoring model utilizes at least one of: (i) quantile bands, and (ii) clustering.

16. The method of claim 13, wherein the selected workflow path includes completing the potential association when the risk score is below a first pre-determined threshold value, preventing the potential association when the risk score is above a second pre-determined threshold value, and applying at least one completion rule when the risk score is between the first and second pre-determined threshold values.

17. A non-transitory, computer-readable medium storing instructions, that, when executed by a processor, cause the processor to perform a risk management method of an enterprise, the method comprising:
accessing, by a model training computer, information in a historical data store containing electronic records representing prior associations with the enterprise and, for each prior association, an electronic record identifier, a set of attribute values, and at least one prior result, wherein the information accessed by the model training computer includes sets of attribute values and prior results for a plurality of prior associations;

training, by the model training computer, a predictive scoring model with historic insurance claim information associated insurance policies along with third-party data;

transmitting the trained predictive scoring model from the model training computer to an automated scoring analysis computer;

accessing, by a computer processor of the automated scoring analysis computer via an encrypted database management system, information in the potential association data store, including sets of attribute values, wherein the potential association data store contains electronic records representing a plurality of potential associations for properties, each property having a building, and the enterprise and, for each potential association, an electronic record identifier and a set of attribute values;

receiving, by a computer processor of the automated scoring analysis computer, an indication of a selected potential association in the potential association data store, including the set of attribute values;

calculating, by the computer processor of the automated scoring analysis computer, a risk score for the selected potential association, representing a risk of loss for a property, based on all of: the trained predictive scoring model, social media data of the property, third-party data, location information, and information about the building, including a building limit per square foot;

outputting, by the computer processor of the automated scoring analysis computer, an indication of the calculated risk score;

receiving, by a computer processor of a back-end application computer server, the indication of the calculated risk score for the selected potential association;

automatically selecting, by the computer processor of the back-end application computer server, a workflow path from a plurality of potential workflow paths based on the indication of the calculated risk score;

executing, by the computer processor of the back-end application computer server, the selected workflow path by modifying a set of information requests including the automatic removal of information requests transmitted from the enterprise when the calculated risk score is below a pre-determined threshold value and the automatic completion of the potential association based on the calculated risk score and responses received in association with the modified set of information requests;

transmitting, by the computer processor of the back-end application computer server, training information to the model training computer to adapt the trained predictive scoring model to changing conditions; and supporting an interactive user interface display in accordance with the selected workflow path via security features and a distributed communication network, wherein the selected workflow path reduces an overall number of electronic messages transmitted by omitting a subset of information request messages transmitted via the communication port when the calculated risk score is below the pre-determined threshold value, and further wherein the interactive user interface display includes all of: (1) an image of the property and building, (2) a linear graphical representation of the calculated risk score, and (3) an indication of the selected workflow path.

18. The medium of claim 17, wherein each electronic record represents a potential insurance policy and the calculated risk score comprises an underwriting grade indicating a risk of loss for a property and building covered by the potential insurance policy.

19. The medium of claim 18, wherein each potential insurance policy at least one of: (i) an insurance policy quote, (ii) an existing insurance policy, and (iii) an insurance policy renewal.

20. The medium of claim 18, wherein an indication of an electronic record of interest is returned as a result of an insurance policy search input.

* * * * *